US010218605B2

United States Patent
Clarke et al.

(10) Patent No.: US 10,218,605 B2
(45) Date of Patent: Feb. 26, 2019

(54) ON-DEMAND CONTROL PLANE REDUNDANCY

(71) Applicant: Cisco Technology, Inc., San Jose, CA (US)

(72) Inventors: Joseph Michael Clarke, Raleigh, NC (US); Gonzalo Salgueiro, Raleigh, NC (US); Charles Calvin Byers, Wheaton, IL (US)

(73) Assignee: Cisco Technology, Inc., San Jose, CA (US)

( * ) Notice: Subject to any disclaimer, the term of this patent is extended or adjusted under 35 U.S.C. 154(b) by 7 days.

(21) Appl. No.: 15/493,384

(22) Filed: Apr. 21, 2017

(65) Prior Publication Data

US 2018/0309662 A1    Oct. 25, 2018

(51) Int. Cl.
*H04L 12/707* (2013.01)
*H04L 29/08* (2006.01)
*H04L 12/24* (2006.01)
*H04L 29/06* (2006.01)

(52) U.S. Cl.
CPC ........ *H04L 45/22* (2013.01); *H04L 29/06183* (2013.01); *H04L 41/0803* (2013.01); *H04L 41/0806* (2013.01); *H04L 67/10* (2013.01)

(58) Field of Classification Search
CPC ......... H04L 45/22; H04L 67/10; H04L 29/00; H04L 29/06183; H04L 29/08099; H04L 41/0803; H04L 41/08; H04L 41/0806; H04L 41/00; G06F 9/445
See application file for complete search history.

(56) References Cited

U.S. PATENT DOCUMENTS

| 8,953,439 | B1 * | 2/2015 | Lin | G06F 11/1484 370/218 |
| 2007/0208927 | A1 * | 9/2007 | Bellens | H04L 12/66 713/1 |
| 2007/0214401 | A1 * | 9/2007 | Chow | H04L 49/552 714/776 |
| 2008/0082630 | A1 * | 4/2008 | Molotchko | G06F 11/2097 709/218 |
| 2010/0214949 | A1 * | 8/2010 | Smith | H04L 45/586 370/254 |
| 2012/0163391 | A1 * | 6/2012 | Shukla | H04L 45/24 370/401 |
| 2013/0182574 | A1 * | 7/2013 | So | H04L 47/122 370/236 |
| 2014/0025826 | A1 * | 1/2014 | Xia | H04L 41/00 709/226 |

(Continued)

*Primary Examiner* — Warner Wong
(74) *Attorney, Agent, or Firm* — Polsinelli PC

(57) ABSTRACT

Disclosed is a router (and method) for virtualizing a control plane of the router without redundancy. The router can include a processor, a data plane, a control plane, and a computer-readable storage medium having stored therein instructions which, when executed by the processor, cause the processor to request, a cloud service to instantiate a virtual instance of the control plane, receive a confirmation of instantiation of the virtual instance, transfer to the virtual instance of the control plane, an active state of the control plane, perform offline services (e.g., configuration change, operating system update, or firmware upgrade, etc.) and in response to completion of the offline services, receive the active state.

20 Claims, 4 Drawing Sheets

(56) References Cited

U.S. PATENT DOCUMENTS

| | | | |
|---|---|---|---|
| 2014/0181278 A1* | 6/2014 | Brandwine | H04L 41/0806 709/221 |
| 2014/0192808 A1* | 7/2014 | Thubert | H04L 45/74 370/392 |
| 2014/0280827 A1* | 9/2014 | Kamble | H04L 41/08 709/223 |
| 2016/0226793 A1* | 8/2016 | Wittenschlaeger | H04L 49/15 |
| 2016/0254958 A1* | 9/2016 | Chen | H04L 41/5096 709/220 |
| 2017/0070412 A1* | 3/2017 | Kanevsky | H04L 43/10 |
| 2017/0199751 A1* | 7/2017 | Sama | G06F 9/45533 |
| 2018/0109471 A1* | 4/2018 | Chang | H04L 49/70 |
| 2018/0123897 A1* | 5/2018 | Lee | H04L 41/12 |
| 2018/0167319 A1* | 6/2018 | Qian | H04L 45/38 |
| 2018/0176143 A1* | 6/2018 | Cui | H04L 49/70 |

* cited by examiner

ON-DEMAND CONTROL PLANE REDUNDANCY

TECHNICAL FIELD

The present technology pertains to redundancy for a control plane and more specifically to instantiating a virtual control plane for performing offline services.

BACKGROUND

Many network deployments (e.g., remote offices, branch sites, small business, schools, home offices, Internet-of-Things—fog nodes, medical devices, etc.) may only have one Internet connected router/firewall (e.g., no redundancy). The lack of redundancy can inhibit maintenance and performance activities (e.g., upgrades) that require downtime. In some instances, downtime can be scheduled outside of business hours for maintenance and performance activities. However, in other instances, downtime is not possible (e.g., critical operations, web servers, etc.). In some instances, having temporary redundancy may be desired.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed is a router (and method) for virtualizing a control plane of the router without redundancy. The router can include a processor, a data plane, a control plane, and a computer-readable storage medium having stored therein instructions which, when executed by the processor, cause the processor to request, a cloud service to instantiate a virtual instance of the control plane, receive a confirmation of instantiation of the virtual instance, transfer to the virtual instance of the control plane, an active state of the control plane, perform offline services (e.g., configuration change, operating system update, or firmware upgrade, etc.) and in response to completion of the offline services, receive the active state.

The router (and method) can further comprise instructions which when executed by the processor cause the processor to establish, a secure tunnel between the router and the cloud service. The router (and method) can further comprise instructions which when executed by the processor cause the processor to, in response to the performance of the offline services, receive an indication the tunnel between the router and the cloud services have been disconnected and re-establish, by a boot loader of the router, the secure tunnel. In some examples, before the re-establishment of the tunnel a data plane of the router will forward incoming packets using previous programming.

The router (and method) can further comprising instructions which when executed by the processor cause the processor to receive, one or more packets at a data plane of the router, during the offline services being performed, send, to the virtual control plane, routing information of the one or more packets, receive, at the data plane of the router, destination instructions for transmission of the one or more packets and send, the one or more packets by the data plane of the router, to the destination.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Disclosed is a system and method for redundancy as a service (e.g., on demand). The system and method include a device (e.g., a router, etc.) that requests to a cloud-hosted service to instantiate a virtual instance of at least part of the device itself. The virtual instance is similar enough from a control and management plane perspective and capable of hosting the device's current state (e.g., active/standby). Once the virtual instance is running, the device can synchronize the control and management plane state to the virtualized instance of the device (e.g., active/standby configuration). At this point, the device has a redundant peer in the cloud, with an up-to-date (or nearly so) view of its current state. After the transfer of the active state to the virtual instance in the cloud, offline operations (e.g., upgrades, configuration changes, etc.) can be performed on the device (e.g., locally) that could impact service capabilities of the device (e.g., an upgrade of the control plane OS, or even control processor hardware replacement). Once the cloud instance is created, the state from the router (i.e., router 102) is synchronized to the cloud instance, and control is handed to the cloud instance until such time that the router has exited offline operations and is "online". At that time, the state of the cloud instance can be synchronized in the opposite direction (to the router), ensuring that the state of the router is restored to a current state from the cloud.

Figure 1:
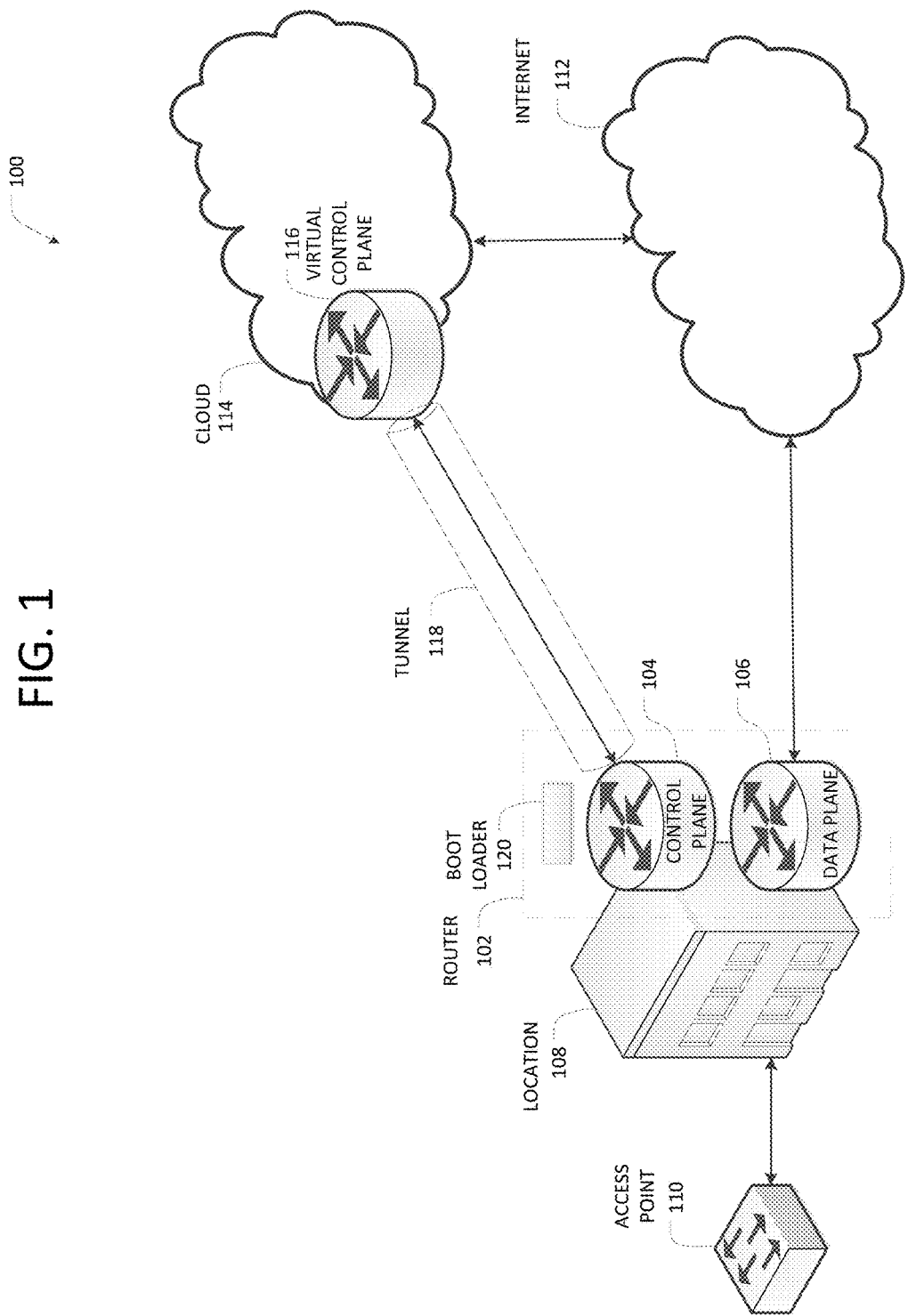
FIG. 1 illustrates a diagram of an example virtual control plane in a communication network.

FIG. 1 illustrates an example virtual control plane in a communication network. Communication network 100 can include a router 102 with a control (and management) plane 104 and data plane 106. Router 102 can be physically located at location 108 (e.g., branch location, remote location, etc.). In some examples, router 102 can be located anywhere without a redundant router configured (e.g., failover capabilities). Control plane 104 can be responsible for routing data to and from router 102. Control packets originate from or are destined for router 102. Control plane 104 can include functions, such as, system configuration and system management (e.g. operating system, kernel, etc.). Data plane 106 (e.g., user plane, forwarding plane, carrier plane, bearer plane, etc.) can carry user traffic to and from router 102. Data plane 106 can be driven by, for example, the control plane (e.g., firmware, operating system, kernel (Linux, etc.), boot loader, etc). The data plane can be configured with persistent power over Ethernet (e.g., as long as power is supplied to router 102, data plane can receive and transmit data).

Router 102 can be connected to access point 110 for communicatively coupling to an enterprise network. Router 102 can also be communicatively coupled to Internet 112 and a cloud 114. Cloud 114 can provide shared processing resources and data to router 102 (and other devices) on demand.

Router 102 can communicatively couple with cloud 114 (e.g., through Internet 112). Router 102 can instantiate a virtual control plane 116 on cloud 114. Router 102 can also monitor, store, and report statistics on incoming and outgoing traffic, logs, etc. In some examples, cloud 114 can virtualize the kernel/operating system of control plane 104 of router 102 as virtual control plane 116 on cloud 114. In some examples, control plane 104 can include routing tables, Network Address Translation (NAT) tables, Address Resolution Protocol (ARP) table, routing database, Access Control Lists (ACL), etc., which can be virtualized on virtualize control plane 116. For example, router 102 (e.g., integrated service router, etc.) can be capable of video-conferencing, virtualization services and transport other kinds of rich media over a network (e.g., wide area network, etc.). The integrated services router can be running an operating system (e.g., IOS-XE, IOS, etc.) on top of a kernel (e.g., BinOS, Linux, etc.). The operating system can include routing, switching, internetworking and telecommunications functions. In some examples, the operating system can additionally run as a separate process. The kernel/operating system can be virtually instantiated on cloud 114 (e.g., as virtual control plane 116).

Router 102 can establish tunnel 118 to cloud 114 (through Internet 112). Tunnel 118 enables secure communication between router 102 and cloud 114 (and virtual control plane 116). Tunnel 118 can enable a foreign protocol to run over a network. For example, tunnel 118 can enable a specific outbound protocol in a software-defined network (SDN) designed to facilitate the communications between the SDN Controller and infrastructure (e.g., switches and routers). For example, tunnel 118 can enable communicate between virtual control plane 116 and data plane 106, as if virtual control plane 116 was control plane 104 (of router 102). Tunnel 118 can have two levels of traffic. The two levels of traffic can be the traffic from the real router to the virtual router (and vice versa) and the traffic bound to the real router. The first level can be peer protocols like border gateway protocol (BGP), next hop resolution protocol (NHRP), etc. The protocols can be hair-pinned (e.g., traffic comes from one source into a router or similar devices, makes a U-turn and goes back the same way it came) to the virtual control plane. This could happen with switch fabric card (SFC) over Virtual Extensible LAN (VXLAN) or Generic Protocol Extension (GPE) as the virtual data plane (e.g., remote cloud instance) is essentially a network service function. The second level of traffic is the control-to-data-plane programming traffic. The protocol used here is any protocol designed to support remote data plane programming (e.g., OpenFlow, any proprietary protocol, etc.). For example, when the router is a BGP peer, BGP updates will come in from the remote peer to the customer instance (e.g., control plane 104). From there, the BGP updates are encapsulated and tunneled from the customer instance (e.g., at location 108) to the virtual control plane at the cloud instance (e.g., cloud 114). decapsulated, processed, encapsulated, and sent back through the tunnel to be decapsulated and sent back to the remote peer (e.g., destination).

Control plane 104 and virtual control plane 116 can be configured in an active/standby configuration. When control plane 104 is taken offline, virtual control plane 116 can take over the active role. While virtual control plane 116 is active, control plane 104 is inactive (e.g., standby) and data plane 106 is active. As such, virtual control plane 116 can handle all incoming and outgoing communication (through tunnel 118) and instruct data plane 106 on where and how to transmit data (e.g., by utilizing the translation tables, routing tables, policies, or any other elements that would influence the routing of router 102).

After the virtual control plane has taken the active role (of the control plane of the router), the control plane of the router can go offline (e.g., to be upgraded, repaired, reconfigured, etc.). When the control plane goes offline the tunnel will also go offline, rendering the virtual control plane unable to communication with the router. In order to continue active routing (by the virtual control plane) the tunnel must be re-established. The tunnel can be re-established by boot loader 120 of the router. For example, after the active role has been assigned to the virtual control plane, the control plane can be taken to the boot loader (e.g., a program that loads an operating system on the control plane). The boot loader can automatically, without user input, re-establish the tunnel. In some examples, the boot loader can include network connectivity and a command line interface (for user operations). During this time the tunnel is not established, the control plane and virtual control plane will be unable to instruct the data plane on how/where to route data. However, the data plane can still be forwarding traffic using the previous programming. For example, by utilizing forwarding tables. The data plane can be programmed from the routing information base (RIB) and will maintain the RIB that enables hardware-assisted forwarding of incoming data. Once the tunnel is re-established, the virtual control plane can begin instructing the data plane.

Once the virtual cloud plane and virtual tunnel are configured in cloud 114, control plane 104 can be taken offline, upgraded, reconfigured, etc. (without affecting the operation of router 102). When control plane 104 is brought back online, it can regain control operations and virtual control plane and tunnel can be destroyed. In some examples, new states or routes may be temporarily unavailable (i.e., in this state), but existing routes (and existing applications) should continue to operate normally.

In some instances, portions of the operating system can be upgraded independent from each other (e.g., microkernel or container based control plane elements). For example, when the operating system is running as an additional process (on the underlying kernel), the additional process can be instantiated in the cloud. In other examples, the router (and operating system) can be run as a virtual machine in a hypervisor. In other examples, the router (and operating system) can be in containers. In each of these examples, the control plane of the router could be upgraded without interfering with the underlying operating system while providing redundancy in a cloud instance. For example, the operating system running as an additional process can be taken offline (e.g., for upgrade, configuration, etc.) and the state can be transferred to the virtual instance on the cloud. When the state has been transferred, all responsibilities of the process can be handled by the virtual instance on the cloud. When the operating system running as an additional process comes back online, the state can be transferred back and the virtual instances can be destroyed.

In some examples, the router could have a catastrophic failure (e.g., routing going down, failure in software, in a field-replaceable unit not in the critical path to the cloud router, etc.). The architecture of the router's fabric and the default routers pre-configuration (e.g., static route to the cloud that can bypass a failure of dynamic routing, a redundant path to the cloud—such as through an ISDN or other backup link, etc.) can enable the control traffic to bypass the failed resources (e.g., control plane), and route over the control plane tunnel (e.g., virtual control plane). Similar pre-configured routes can enable individual line cards (e.g., a modular electronic circuit designed to fit on a separate printed circuit board and interface with a telecommunications access network) to receive data (at least partially) from failed fabrics. As long as the packet processor for the ingress traffic (e.g., incoming) can reach the virtual cloud plane over some Internet-path, the router can continue many of its routing operations. Maintaining routing operations is valuable for supporting mission critical applications.

In some examples, a container model can be used to abstract the context of a network element (e.g., routers) and transfer it to a remote node (e.g., cloud) for execution. The container can hold the state of a node (e.g., router) during normal operation, and can periodically check-point the state (e.g., active) of the node to the cloud node (e.g., virtual cloud instance). Should redundancy of the node be required (e.g., either because of a control plane failure on the node, due to maintenance activity, etc.), the cloud container has adequate control to step in and take over the control plane (e.g., receive active state).

In some examples, fog and peer-to-peer models can be used as redundant control planes. A fog model is a decentralized computing infrastructure in which data, compute, storage and applications are distributed in the most logical, efficient place between the data source and the cloud. A peer-to-peer model is a distributed application architecture that partitions tasks or workloads between peers. Fog and peer-to-peer models can be utilized when a node cannot tolerate the control plane latency (e.g., order of 100 millisecond) associated with cloud-based cooperation. For examples, the round trip time between router 102 and virtual control plane 114. In fog models, the nodes can appropriately required that they are logically and physically closer to the fog nodes to reduce latency. In the fog models, the virtual control plane may run on the fog nodes instead of in cloud. Fog models can also be configured to improve network bandwidth use, security and reliability. In some examples, when spare resources (e.g., extra CPU cores) are available on a nearby peer node (e.g., as may be the case in many Internet-of-Things (IoT) networks), the virtualization of the control plane could be helpful to build a duplex pair relationship (e.g., where spare resources in one node back up similar operational resources in its mate node). In this example, identical (or similar) models are not needed for the pair because the details of the control infrastructure are virtualized on the mate unit (e.g., unlike non-virtualized systems where identical mates are required).

In other examples the remote cloud instance can enable analytical insight into protocol and feature usage (for vendors) as well as operational guidance for customers around best practices given the analyzed device states.

Figure 2:
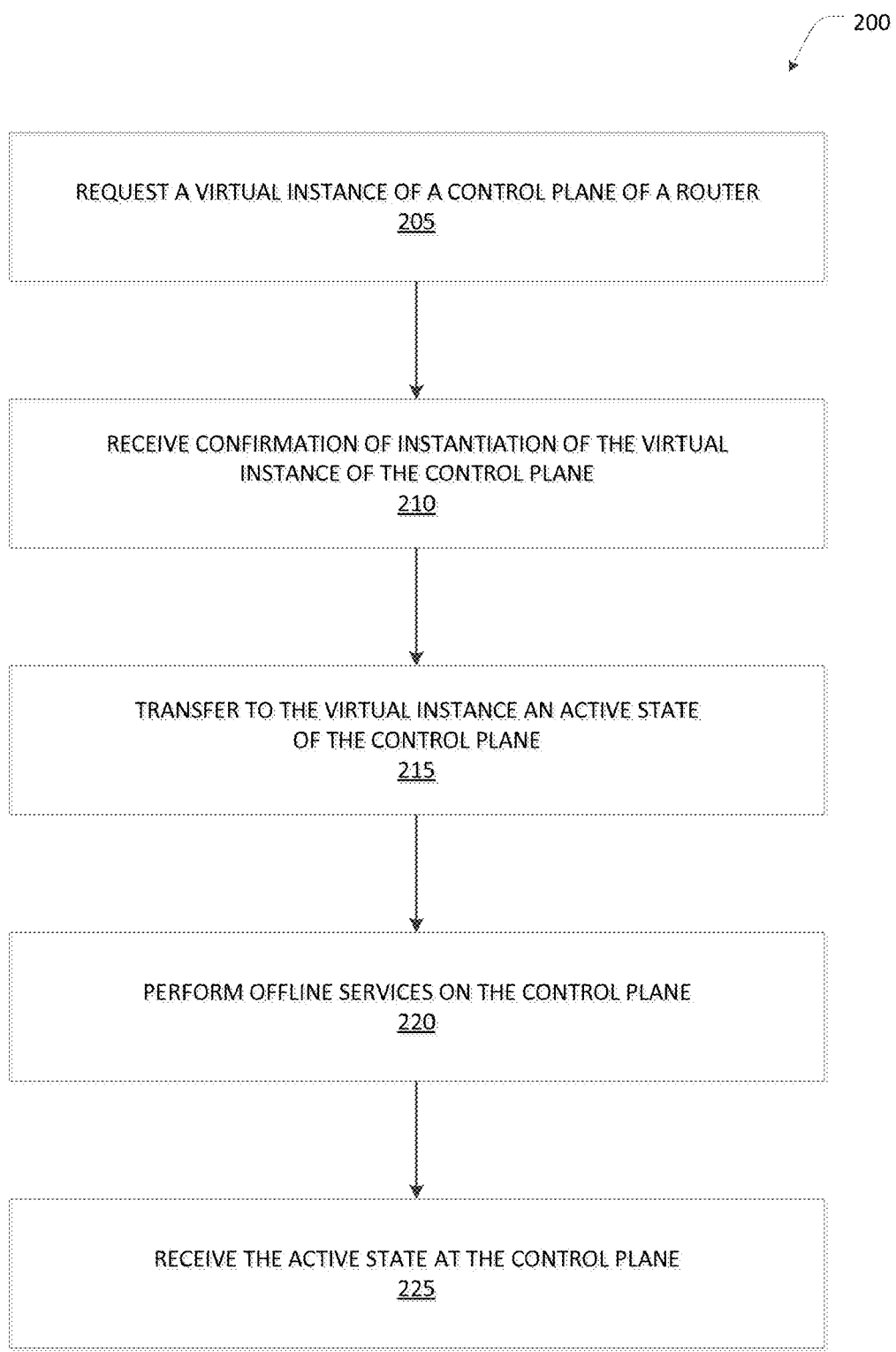
FIG. 2 illustrates a flow chart of an example method for virtualizing a control plane.

The method shown in FIG. 2 is provided by way of example, as there are a variety of ways to carry out the method. Additionally, while the example method is illustrated with a particular order of blocks, those of ordinary skill in the art will appreciate that FIG. 2 and the blocks shown therein can be executed in any order that accomplishes the technical advantages of the present disclosure and can include fewer or more blocks than illustrated.

Each block shown in FIG. 2 represents one or more processes, methods or subroutines, carried out in the example method. The blocks shown in FIG. 2 can be implemented in a network environment such as network environment 100 shown in FIG. 1. The flow chart illustrated in FIG. 2 will be described in relation to and make reference to at least the elements of system 100 shown in FIG. 1.

FIG. 2 shows a flow diagram of an example method 200 for virtualizing a control plane. Method 200 can begin at block 205. At block 205 a router can request a cloud instantiate a virtual instance of a control plane of the router. For example, router 102 at location 108 can send a request to cloud 114 to instantiate control plane 104 as virtual control plane 116. In some examples, router 102 at location 108 cannot have redundancy (e.g., failover capabilities if taken offline). The instantiated virtual control plane (e.g., 116) can be configured to operate as the control plane of the router that can be executed from the cloud. For example, virtual control plane 116 can include a kernel (e.g., Linux, BinOS, etc.), an operating system (IOS-XE, etc.), and associated applications and tables (e.g., routing tables, etc.) so the virtual control plane matches the control plane. In some examples, a boot loader of router 102 can also create a tunnel for transferring data between router 102 and cloud 114.

At block 210, the router can receive confirmation the virtual control plane has been instantiated. At block 215, the router can transfer an active state to the virtual control plane. For example, router 102 can transfer the active state (e.g., currently owned by control plane 104) to virtual control plane (e.g., currently in standby state). In response to transferring the active state to the virtual control plane, the control plane in the router can enter a standby state (e.g., no longer actively routing data).

At block 220, offline services can be performed on the router. For example, control plane 104 can be taken offline, upgraded, reconfigured, reprogrammed, repaired, etc. without disrupting the routing of incoming and/or outgoing data (e.g., which are being handled by the virtual control plane).

At block 225, the control plane at the router can receive the active state. For examples, the active state can be transferred from virtual control plane 116 to control plane 104. In response, virtual control plane 116 can enter a standby state and can also be destroyed. In some examples, the tunnel between router 102 and cloud 114 can also be destroyed.

Figure 3:
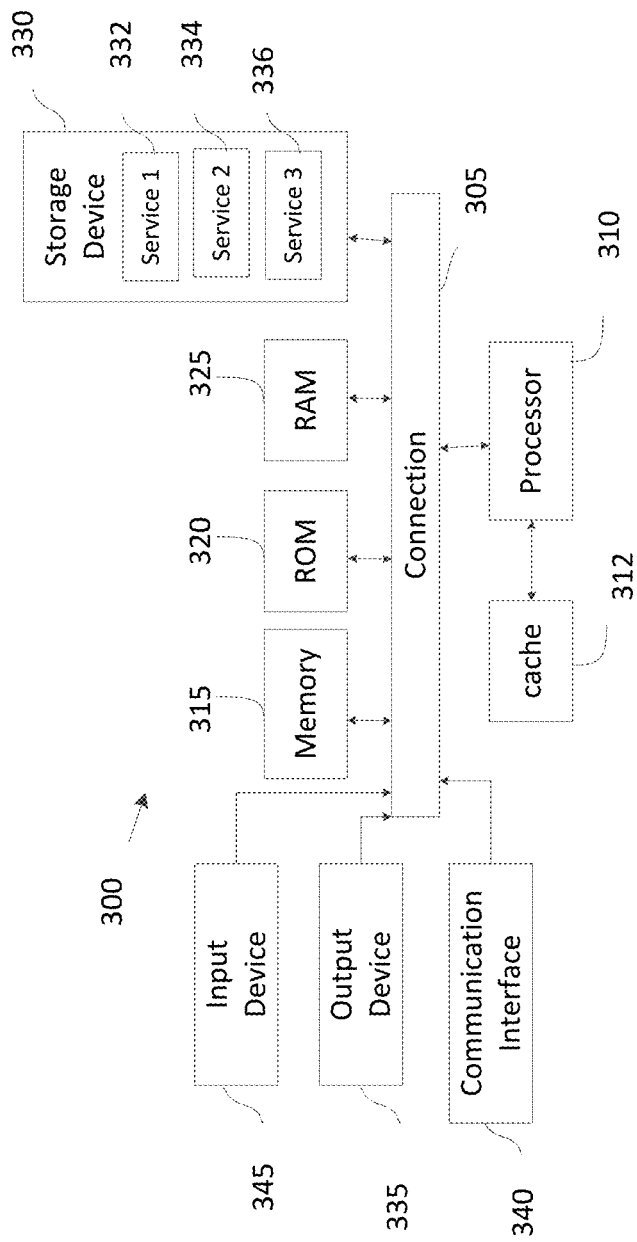
FIG. 3 shows an example of a system for implementing certain aspects of the present technology.

FIG. 3 shows an example of computing system 300 in which the components of the system are in communication with each other using connection 305. Connection 305 can be a physical connection via a bus, or a direct connection into processor 310, such as in a chipset or system-on-chip architecture. Connection 305 can also be a virtual connection, networked connection, or logical connection.

In some embodiments computing system 300 is a distributed system in which the functions described in this disclosure can be distributed within a datacenter, multiple datacenters, a peer network, throughout layers of a fog network, etc. In some embodiments, one or more of the described system components represents many such components each performing some or all of the function for which the component is described. In some embodiments, the components can be physical or virtual devices.

Example system 300 includes at least one processing unit (CPU or processor) 310 and connection 305 that couples various system components including system memory 315, read only memory (ROM) 320 or random access memory (RAM) 325 to processor 310. Computing system 300 can include a cache of high-speed memory 312 connected directly with, in close proximity to, or integrated as part of processor 310.

Processor 310 can include any general purpose processor and a hardware service or software service, such as services 332, 334, and 336 stored in storage device 330, configured to control processor 310 as well as a special-purpose processor where software instructions are incorporated into the actual processor design. Processor 310 may essentially be a completely self-contained computing system, containing multiple cores or processors, a bus, memory controller, cache, etc. A multi-core processor may be symmetric or asymmetric.

To enable user interaction, computing system 300 includes an input device 345, which can represent any number of input mechanisms, such as a microphone for speech, a touch-sensitive screen for gesture or graphical input, keyboard, mouse, motion input, speech, etc. Computing system 300 can also include output device 335, which can be one or more of a number of output mechanisms known to those of skill in the art. In some instances, multimodal systems can enable a user to provide multiple types of input/output to communicate with computing system 300. Computing system 300 can include communications interface 340, which can generally govern and manage the user input and system output, and also connect computing system 300 to other nodes in a network. There is no restriction on operating on any particular hardware arrangement and therefore the basic features here may easily be substituted for improved hardware or firmware arrangements as they are developed.

Storage device 330 can be a non-volatile memory device and can be a hard disk or other types of computer readable media which can store data that are accessible by a computer, such as magnetic cassettes, flash memory cards, solid state memory devices, digital versatile disks, cartridges, battery backed random access memories (RAMs), read only memory (ROM), and/or some combination of these devices.

The storage device 330 can include software services, servers, services, etc., that when the code that defines such software is executed by the processor 310, it causes the system to perform a function. In some embodiments, a hardware service that performs a particular function can include the software component stored in a computer-readable medium in connection with the necessary hardware components, such as processor 310, connection 305, output device 335, etc., to carry out the function.

Figure 4:
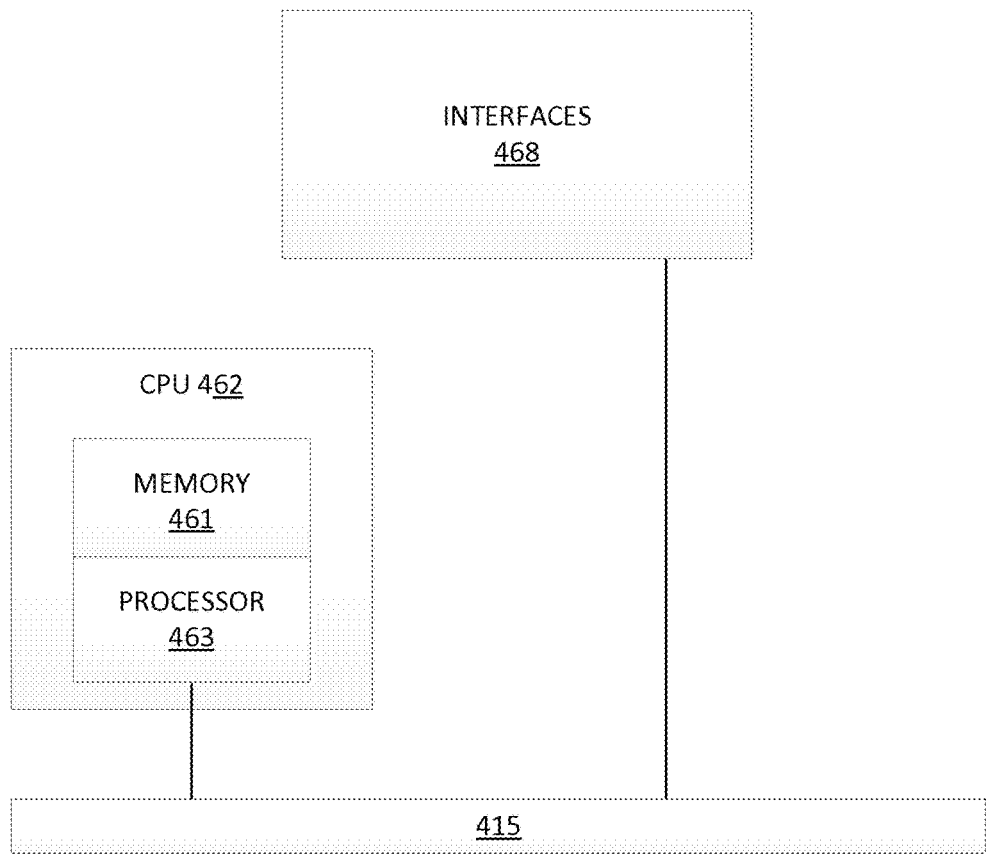
FIG. 4 illustrates an example network device.

FIG. 4 illustrates an example network device 410 suitable for routing, switching, forwarding, traffic management, and load balancing. Network device 410 can be, for example, a router, a switch, a controller, a gateway, and/or any other L2 and/or L3 device.

Network device 410 can include a master central processing unit (CPU) 462, interfaces 468, and a bus 415 (e.g., a PCI bus). When acting under the control of appropriate software or firmware, the CPU 462 is responsible for executing packet management, error detection, load balancing operations, and/or routing functions. The CPU 462 can accomplish all these functions under the control of software including an operating system and any appropriate applications software. CPU 462 may include one or more processors 463, such as a processor from the Intel family of microprocessors, ARM family of processor, the Motorola family of microprocessors, the MIPS family of microprocessors, etc. In an alternative embodiment, processor 463 is specially designed hardware for controlling the operations of network device 410. In a specific embodiment, a memory 461 (such as non-volatile RAM and/or ROM) also forms part of CPU 462. However, there are many different ways in which memory could be coupled to the system.

The interfaces 468 are typically provided as interface cards (sometimes referred to as "line cards"). Generally, they control the sending and receiving of data packets over the network and sometimes support other peripherals used with the network device 410. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces, Power over Ethernet "PoE" interfaces, Wi-Fi interfaces, Low Power Wide Area Network radios such as "LoRa" interface, other wireless interfaces (e.g., short range, etc.), and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 462 to efficiently perform routing computations, network diagnostics, security functions, etc.

Although the system shown in FIG. 4 is one specific network device of the present invention, it is by no means the only network device architecture on which the present invention can be implemented. For example, an architecture having a single processor that handles communications as well as routing computations, etc. is often used. Further, other types of interfaces and media could also be used with the router.

Regardless of the network device's configuration, it may employ one or more memories or memory modules (including memory 461) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, containers, etc.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A computer-implemented method comprising:
   requesting, by a router to a cloud service, instantiation of a virtual instance of a control plane of the router;
   receiving, by the router, confirmation of instantiation of the virtual instance of the control plane;
   transferring, to the virtual instance of the control plane, an active state of the control plane;
   performing, at the router, offline services; and
   in response to completion of the offline services, receiving at the control plane, the active state.

2. The method of claim 1, wherein a secure tunnel between the router and the cloud service is established.

3. The method of claim 2, further comprising:
   in response to performing the offline services, the tunnel between the router and the cloud services being disconnected; and
   re-establishing, by a boot loader of the router, the secure tunnel.

4. The method of claim 3, wherein the offline services are at least one of a configuration change, operating system update, or firmware upgrade.

5. The method of claim 3, wherein during the re-establishment of the tunnel a data plane of the router will forward incoming packets using previous programming.

6. The method of claim 1, further comprising:
   receiving, one or more packets at a data plane of the router, during the offline services being performed;
   sending, to the virtual control plane, routing information of the one or more packets;
   receiving, at the data plane of the router, destination instructions for transmission of the one or more packets; and
   sending, the one or more packets by the data plane of the router, to the destination.

7. The method of claim 1, wherein the router does not have redundancy.

8. A router comprising:
   a control plane being communicatively coupled to a data plane; and
   a non-transitory computer-readable storage medium having stored therein instructions which, when executed by a processor, cause the processor to:
      request, a cloud service to instantiate a virtual instance of the control plane;
      receive a confirmation of instantiation of the virtual instance;
      transfer to the virtual instance of the control plane, an active state of the control plane;
      perform offline services; and
      in response to completion of the offline services, receive the active state.

9. The router of claim 8, wherein a secure tunnel between the router and the cloud service is established.

10. The router of claim 8, further comprising instructions which when executed by the processor cause the processor to:
    in response to performing the offline services, receive an indication the secure tunnel between the router and the cloud services is disconnected; and
    re-establish, by a boot loader of the router, the secure tunnel.

11. The router of claim 10, wherein the offline services are at least one of a configuration change, operating system update, or firmware upgrade.

12. The router of claim 10, wherein during the re-establishment of the tunnel a data plane of the router will forward incoming packets using previous programming.

13. The router of claim 8, further comprising instructions which when executed by the processor cause the processor to:
    receive, one or more packets at a data plane of the router, during the offline services being performed;
    send, to the virtual control plane, routing information of the one or more packets;

receive, at the data plane of the router, destination instructions for transmission of the one or more packets; and send, the one or more packets by the data plane of the router, to the destination.

14. The router of claim 8, wherein the router does not have redundancy.

15. A non-transitory computer-readable storage medium having stored therein instructions which, when executed by a processor of a router, cause the processor to perform operations comprising:

request, a cloud service to instantiate a virtual instance of a control plane of the router;

receive a confirmation of instantiation of the virtual instance;

transfer to the virtual instance of the control plane, an active state of the control plane;

perform offline services; and in response to completion of the offline services, receive the active state.

16. The non-transitory computer-readable storage medium of claim 15, wherein a secure tunnel between the router and the cloud service is established.

17. The non-transitory computer-readable storage medium of claim 15, further comprising instructions which when executed by the processor cause the processor to:

in response to the performance of the offline services, the tunnel between the router and the cloud services being disconnected; and re-establish, by a boot loader of the router, the secure tunnel.

18. The non-transitory computer-readable storage medium of claim 17, wherein the offline services are at least one of a configuration change, operating system update, or firmware upgrade.

19. The non-transitory computer-readable storage medium of claim 17, wherein before the re-establishment of the tunnel a data plane of the router will forward incoming packets using previous programming.

20. The non-transitory computer-readable storage medium of claim 17, further comprising instructions which when executed by the processor cause the processor to:

receive, one or more packets at a data plane of the router, during the offline services being performed;

send, to the virtual control plane, routing information of the one or more packets;

receive, at the data plane of the router, destination instructions for transmission of the one or more packets; and send, the one or more packets by the data plane of the router, to the destination.

\* \* \* \* \*